US012607531B2

(12) United States Patent
Shan et al.

(10) Patent No.: US 12,607,531 B2
(45) Date of Patent: Apr. 21, 2026

(54) SPLIT-TYPE PIEZOELECTRIC SENSOR

(71) Applicants: Keeson Technology Corporation Limited, Jiaxing (CN); Yangtze Delta Region Institute of Tsinghua University, Zhejiang, Jiaxing (CN)

(72) Inventors: Huafeng Shan, Jiaxing (CN); Jiadong Wang, Jiaxing (CN); Kaimin Cao, Jiaxing (CN); Xiuping Han, Jiaxing (CN); Hongwen Li, Jiaxing (CN); Lei Chen, Jiaxing (CN)

(73) Assignees: Keeson Technology Corporation Limited, Jiaxing (CN); Yangtze Delta Region Institute of Tsinghua University, Zhejiang, Jiaxing (CN)

( * ) Notice: Subject to any disclaimer, the term of this patent is extended or adjusted under 35 U.S.C. 154(b) by 892 days.

(21) Appl. No.: 17/908,907

(22) PCT Filed: Mar. 1, 2021

(86) PCT No.: PCT/CN2021/078462
§ 371 (c)(1),
(2) Date: Sep. 1, 2022

(87) PCT Pub. No.: WO2021/196944
PCT Pub. Date: Oct. 7, 2021

(65) Prior Publication Data
US 2024/0201034 A1 Jun. 20, 2024

(30) Foreign Application Priority Data
Apr. 1, 2020 (CN) .......................... 202010253531.7

(51) Int. Cl.
G01L 9/00 (2006.01)
G01L 19/06 (2006.01)
(Continued)

(52) U.S. Cl.
CPC ............ G01L 9/008 (2013.01); G01L 19/069 (2013.01); G01L 19/148 (2013.01); G01P 15/0922 (2013.01)

(58) Field of Classification Search
CPC ..... G01L 9/008; G01L 19/069; G01L 19/148; G01L 1/16; G01P 15/0922; G01D 5/12
See application file for complete search history.

(56) References Cited

U.S. PATENT DOCUMENTS

2021/0215533 A1* 7/2021 Shan .................... A61B 5/6802

FOREIGN PATENT DOCUMENTS

| CN | 104931127 A | 9/2015 |
| CN | 108061563 A | 5/2018 |

(Continued)

OTHER PUBLICATIONS

International Search Report of PCT Patent Application No. PCT/CN2021/078462 issued on May 26, 2021.

(Continued)

*Primary Examiner* — Julio C. Gonzalez

(57) ABSTRACT

A split-type piezoelectric sensor includes a first circuit board and a second circuit board. The first circuit board includes a sub-board, a piezoelectric film, and a first connector. The sub-board and the first circuit board are located on the same plane, and the sub-board is located in a hollow area of the first circuit board and connected to one end in the first circuit board. The piezoelectric film is attached to the sub-board and is electrically connected to the sub-board. The first connector and the piezoelectric film are provided on the same side, and the first connector is electrically connected to the first circuit board. The second circuit board includes a signal processing unit and a second connector electrically connected to the signal processing unit. The second connector is opposite to and detachably connected to the first (Continued)

connector, and the second connector supports the first circuit board.

6 Claims, 6 Drawing Sheets

(51) Int. Cl.
  *G01L 19/14*      (2006.01)
  *G01P 15/09*      (2006.01)

(56)          References Cited

FOREIGN PATENT DOCUMENTS

| | | | | | |
|---|---|---|---|---|---|
| CN | 108398181 | A | * | 8/2018 | ............ G01H 11/08 |
| CN | 209609993 | U | * | 11/2019 | |
| EP | 3751243 | A1 | | 12/2020 | |
| WO | WO-2015098723 | A1 | * | 7/2015 | .............. G01L 1/16 |
| WO | 2019153666 | A1 | | 8/2019 | |

OTHER PUBLICATIONS

European Search Report of European Patent Application No. 21780471.5 issued on Mar. 14, 2024.

* cited by examiner

SPLIT-TYPE PIEZOELECTRIC SENSOR

FIELD OF THE INVENTION

The present disclosure relates to the field of piezoelectric sensing, and in particular to a split-type piezoelectric sensor.

BACKGROUND OF THE INVENTION

A piezoelectric film, which is a novel high polymer type flexible transduction material, can be machined into a vibration sensor or an accelerometer, which is efficient, reliable and cost-effective, and can also be combined with a suitable circuit to form a wireless detecting and monitoring system. A piezoelectric film sensor is widely used in many fields such as buildings, speed and acceleration measurement, medical physiological signal collection and vehicle theft deterrent owing to numerous advantages of the piezoelectric film sensor.

Currently, the piezoelectric film sensor is often of a cantilevered beam type, and a piezoelectric film is attached on an inner side of a cantilevered beam. In this way, when an external longitudinal stress is applied to the sensor, a relatively large stress will be transversely generated, so as to generate deformation and thus an electrical signal, which is converted by a signal processing unit to obtain a specific measurement parameter.

A cantilevered beam structure of an existing piezoelectric film sensor is generally of two types. One is an integrated type, where slotting and hollowing are directly performed on a circuit board capable of signal processing, so as to form the cantilevered beam structure, and a piezoelectric film is then attached on one side of a cantilevered beam that has an electrode (generally on the inner side). However, the attached piezoelectric film is prone to heating influence of the circuit board since the piezoelectric film and a signal processing unit are located on the same circuit board. The bonded piezoelectric film cannot be tested independently. Moreover, an overhaul will be difficult, and after the piezoelectric film is damaged, the sensor must be replaced as a whole, which contributes to increased cost.

The other one is a welding type or a riveting type, where a metal plate or a ceramic plate is selected to be a cantilevered beam, and the metal plate or the ceramic plate attached with a piezoelectric film by way of welding or riveting is then mounted on a substrate carrying a signal processing unit. A welding or riveting end has functions of both connection and signal transmission. However, the piezoelectric film has low temperature resistance as being a high polymer material. During a welding process, the piezoelectric film is possibly damaged or suffers performance degradation. It could also become difficult to test the bonding quality of the film. In addition, the welding or riveting manner is not conducive to the dismantlement of the sensor. In particular, in the riveting manner, it is only possible to realize dismantlement in a destructive manner, which is not conducive to overhaul and reuse of a piezoelectric film board.

SUMMARY OF THE INVENTION

In view of the above-mentioned disadvantages of existing techniques, an objective of the disclosure is to propose a split-type piezoelectric sensor, in which a piezoelectric film can be flexibly replaced and the performance of the piezoelectric film can be readily tested.

In order to achieve the above-mentioned objective, the disclosure provides a split-type piezoelectric sensor, including a first circuit board and a second circuit board.

The first circuit board includes a sub-board, a piezoelectric film, and a first connector. The sub-board and the first circuit board are located on a same plane, and the sub-board is located in a hollow area of the first circuit board and connected to one end in the first circuit board, so that the sub-board is displaceable by taking the end in the first circuit board as a fulcrum. The piezoelectric film is attached to and electrically connected to the sub-board. The first connector and the piezoelectric film are provided on a same side, and the first connector is electrically connected to the first circuit board.

The second circuit board includes a signal processing unit and a second connector electrically connected to the signal processing unit. The second connector is opposite to and detachably connected to the first connector, and the second connector supports the first circuit board.

Furthermore, one side of the second circuit board on which the second connector is arranged is clad with copper.

Furthermore, a plurality of first connectors and a plurality of second connectors are provided, and the first connectors surround the hollow area.

Furthermore, an elastic pad is provided, which is arranged between the piezoelectric film and the second circuit board.

Furthermore, a shielding is arranged on a surface of the first circuit board that is opposite to the piezoelectric film, and the shielding surrounds the hollow area.

Furthermore, the shielding includes a through hole.

The disclosure has a beneficial effect in that the piezoelectric film and a signal processing unit are separated, the piezoelectric film can be detached and tested at any time, and reuse of a piezoelectric film circuit board can be achieved.

The concept, specific structure and resulting effect of the disclosure are further described below in conjunction with the accompanying drawings to fully understand the objectives, features, and effects of the disclosure.

BRIEF DESCRIPTION OF THE DRAWINGS

By reading the following detailed description made with reference to the accompanying drawings for non-limiting embodiments, further features, objectives and advantages of the disclosure will become more apparent.

LIST OF REFERENCE NUMBERS

100—First circuit board; 101—Piezoelectric film; 102—First connector; 103—Sub-board; 104—Metal shielding welding spot; 105—Metal shielding; 106—Through hole; 200—Second circuit board; 201—Second connector; and 202—Elastic pad.

DETAILED DESCRIPTION OF THE EMBODIMENTS

Preferred embodiments of the disclosure are described below with reference to the accompanying drawings of the description to make the disclosed contents clearer and easier to understand. The disclosure can be embodied in various implementations of embodiments, and the scope of the disclosure is not limited to the embodiments mentioned herein.

In the accompanying drawings, an identical reference number indicates components having identical structure, and similar reference numbers indicate assemblies having similar structures or functions throughout. The size and thickness of each assembly shown in the figures are shown arbitrarily, and the disclosure does not define the size and thickness of each assembly. In order to make the illustration clearer, the thickness of the component in some individual places of the accompanying drawings is appropriately exaggerated.

Figure 1:
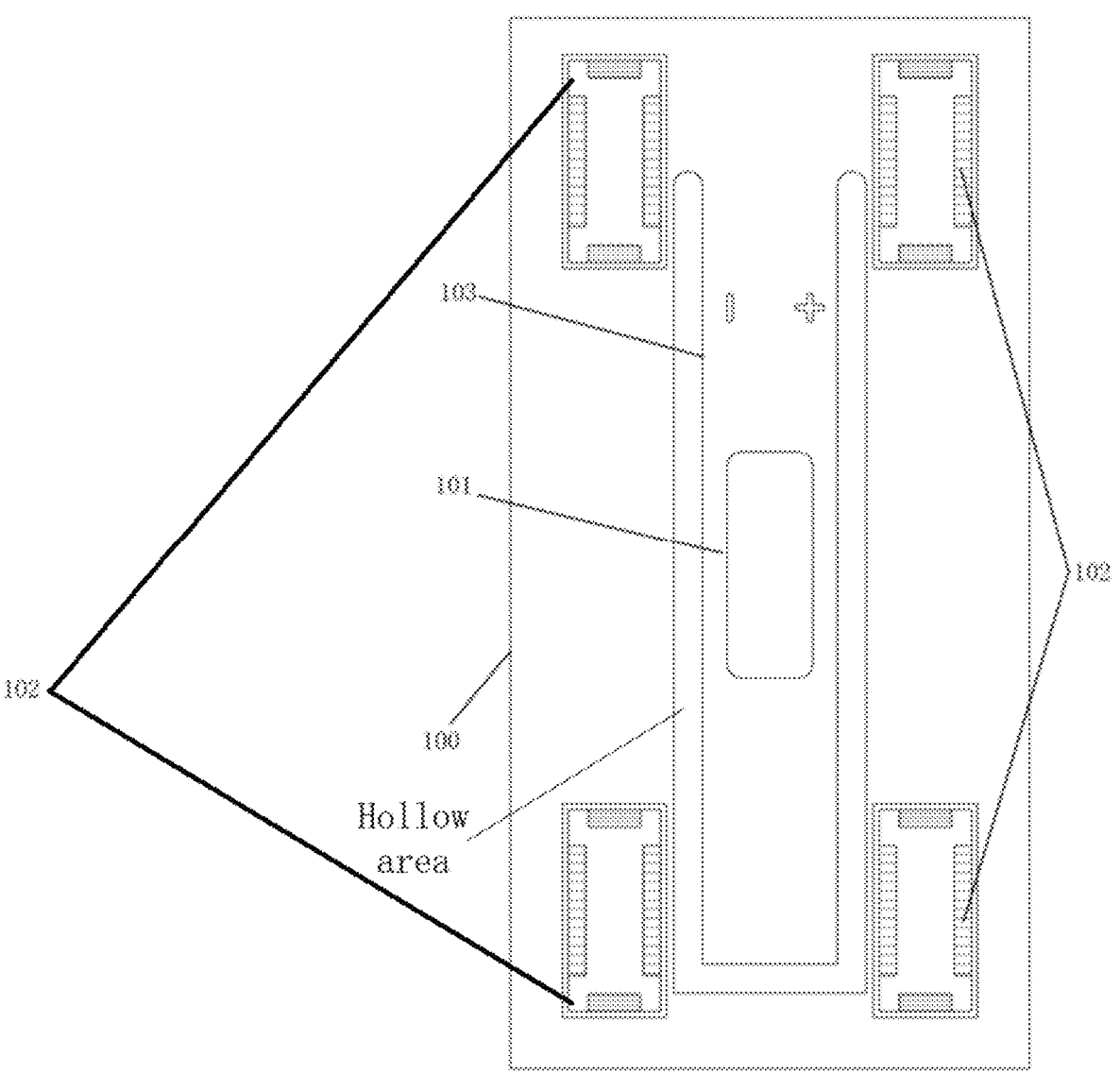
FIG. 1 is a structural bottom view of a first circuit board of the disclosure.

FIG. 1 shows the structure of an inner side of the first circuit board 100. The first circuit board 100 is internally hollowed out. The sub-board 103 located in a hollow area inside the first circuit board 100 is connected to one end in the first circuit board 100, on a same plane as the first circuit board 100. Further, the sub-board 103 is attached with a piezoelectric film 101 which is electrically connected thereto, and is also provided with a first connector 102 on the same side as the piezoelectric film 101.

When a pressure stress is applied, the sub-board 103 can be subject to bending deformation in the direction of the pressure stress and by taking one end connected to the first circuit board 100 as a fulcrum. When the pressure stress is released, the sub-board 103 can undergo a reciprocating displacement due to its elasticity.

The material of the piezoelectric film 101 may be a currently common piezoelectric material, such as polyvinylidene fluoride (PVDF) and polydimethylsiloxane (PDMS), which is not limited herein. The sub-board 103 is subject to deformation when a pressure stress is applied thereto, the piezoelectric film 101 will be forced to deform together, so as to generate an electrical signal. The electrical signal generated by the piezoelectric film 101 is transferred, via a circuit on the first circuit board 100, to the first connector 102 arranged on the same side as the piezoelectric film 101.

Certainly, in order to generate the reciprocating displacement, a tail end of the sub-board 103 is not connected to the circuit board. In addition, it is necessary to reserve a part of space between the first circuit board 100 and the second circuit board 200 in order to provide a sufficient freedom for the displacement of the sub-board 103.

Figure 2:
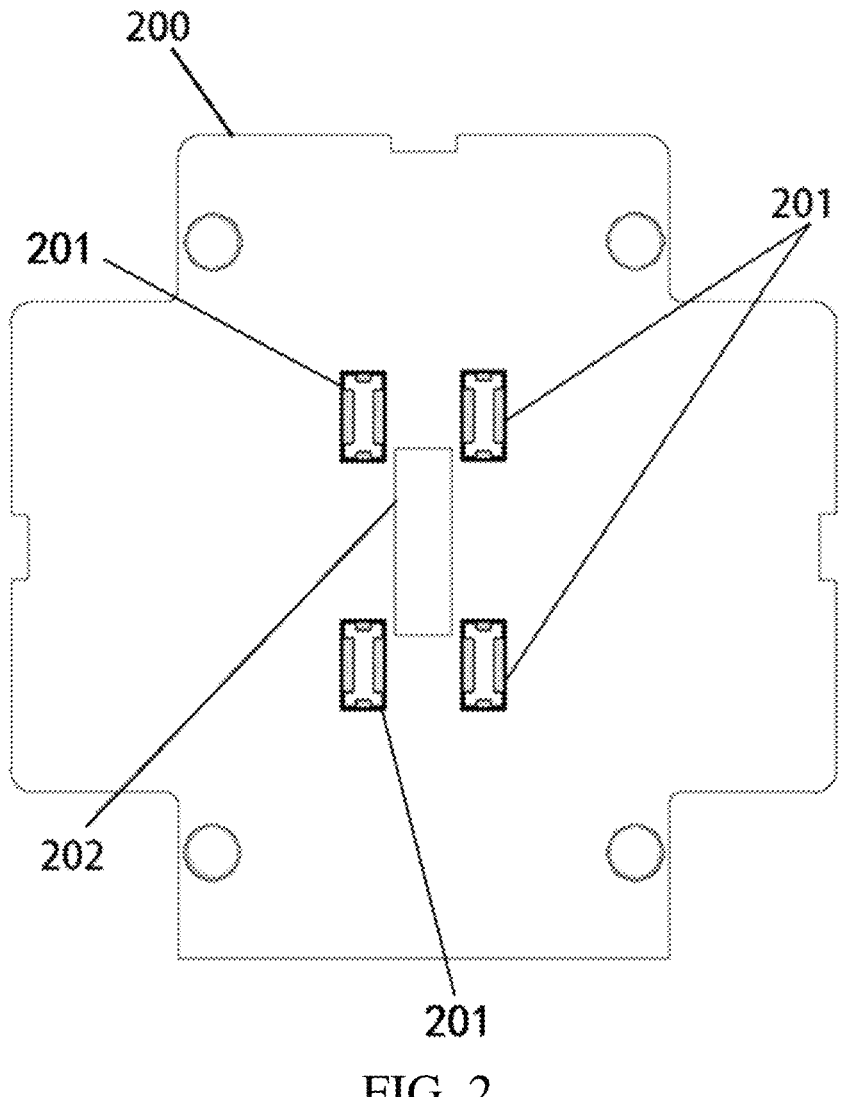
FIG. 2 is a structural schematic diagram of a second circuit board of the disclosure.
Figure 5:
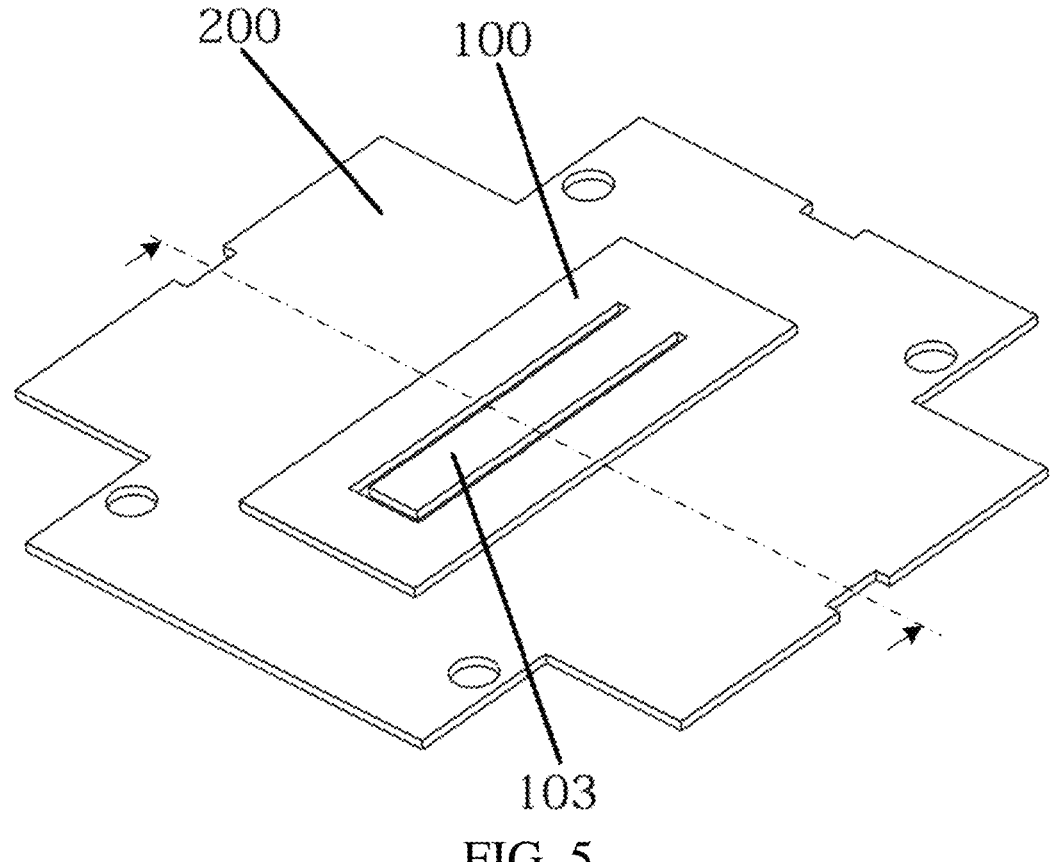
FIG. 5 is a structural perspective view of the connection of the first circuit board and the second circuit board of the disclosure.
Figures 6, 7:
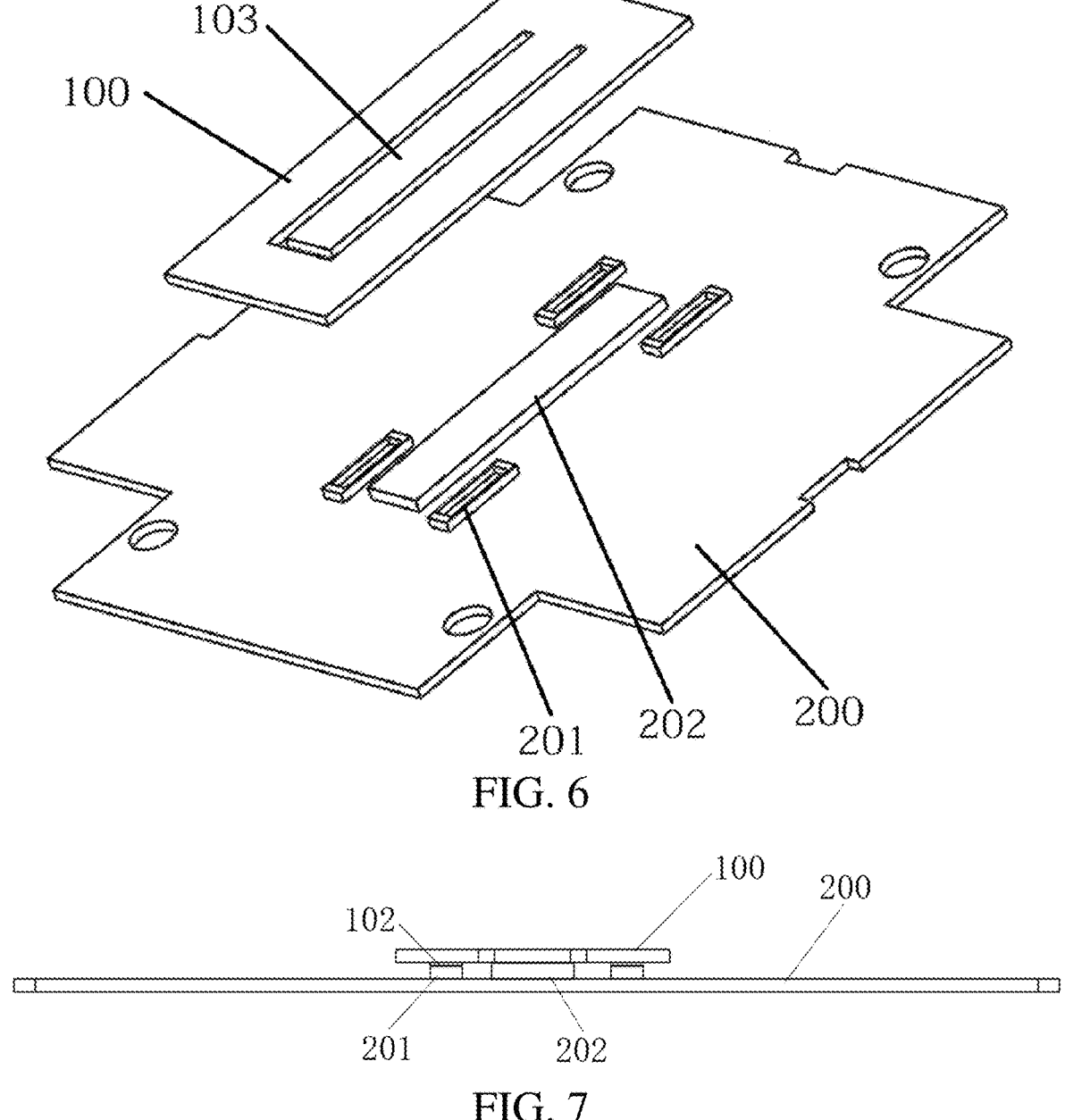
FIG. 6 is a structural perspective view of the first circuit board and the second circuit board of the disclosure.
FIG. 7 represents a cross-sectional view of FIG. 5.

FIG. 2 shows a structural schematic diagram of the second circuit board 200, which is provided with a second connector 201 and an elastic pad 202. In addition, the second circuit board 200 is also integrated with a signal processing unit (not shown in the figures). FIG. 5 shows a structural perspective view of the connection of the first circuit board and the second circuit board of the disclosure. FIG. 6 shows a structural perspective view of the first circuit board and the second circuit board of the disclosure. FIG. 7 represents a cross-sectional view of FIG. 5.

The second connector 201 and the first connector 102 are arranged opposite to each other and detachably connected to each other. The second connector 201 receives the electrical signal transmitted from the first connector 102 and transfers the electrical signal to the signal processing unit, and the signal processing unit responds to the electrical signal and processes it to obtain a test result. During operation of a sensor, the second connector 201 supports the first circuit board 100, such that the second connector, as a support, enables the sub-board 103 to deform when subjected to a pressure stress, and enough detectable electrical signals will be generated from the piezoelectric film 101.

In order to realize a more stable support for the first circuit board 100, more than two first connectors 102, as well as more than two second connectors opposite thereto, can be provided, and can be disposed surrounding a hollow area outside the sub-board 103.

In the embodiment, the first connectors 102 and the second connectors 201 are plug-in board-to-board connectors, each of which has a certain height. When the first circuit board 100 and the second circuit board 200 are arranged in connection, a gap is formed therebetween, and a distance between boards is nominally 0.98 mm.

The elastic pad 202 is arranged within the foregoing gap and should be in contact with the sub-board 103 and the piezoelectric film 101 for relieving a vibration interference caused by externally induced motion of the entire sensor itself. The elastic pad can also support the sub-board 103 and the piezoelectric film 101, and will contribute to generation of a pre-pressure. In this embodiment, the elastic pad 202 is made of soft silicon gel with a thickness of 1 mm. The thickness of the soft silicon gel is variable with the height of the board-to-board connectors. The soft silicon gel optionally has a Shore hardness of 20 to 40, which is adjustable depending on the pressure stress to be measured. In addition, the elastic pad 202 can also be pressed against the piezoelectric film 101, so as to prevent the latter from accidentally falling off.

Furthermore, a surface on one side of the second circuit board 200 that is close to the first circuit board 100 is clad with copper, which is used for being grounded, in order to achieve its function of blocking an ambient electromagnetic noise.

Figure 3:
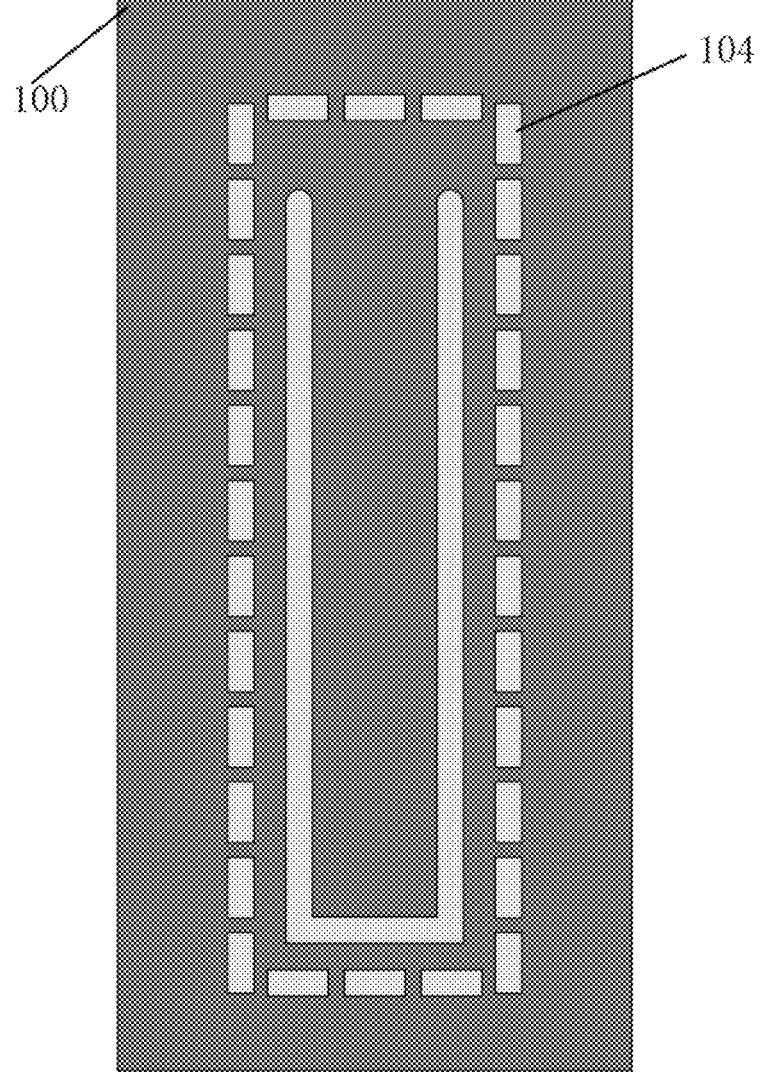
FIG. 3 is a structural top view of the first circuit board of the disclosure.
Figure 4:
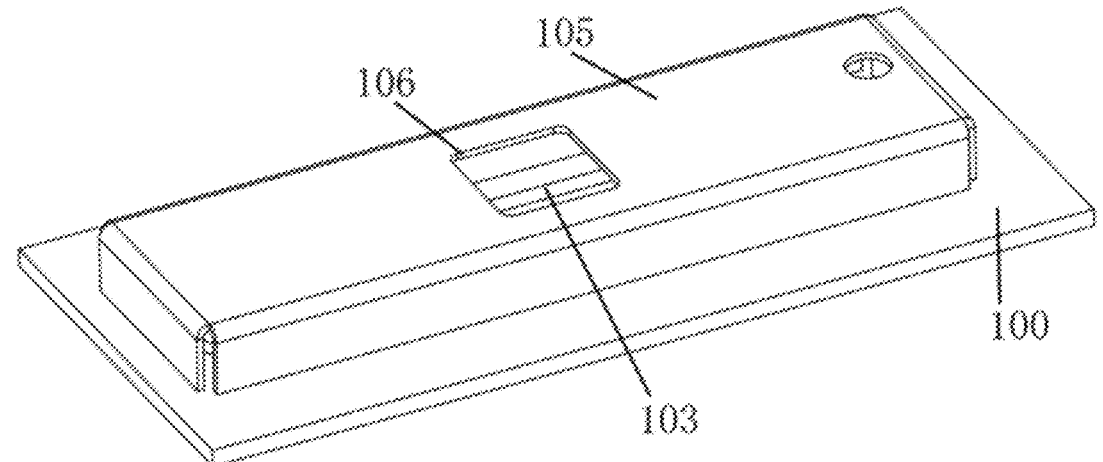
FIG. 4 is a structural perspective view of the first circuit board of the disclosure.

FIGS. 3 and 4 show the structure of an outer side of the first circuit board 100. There is a metal shielding 105 outside the hollow area. The metal shielding 105, generally made of a zinc-copper-nickel alloy, surrounds the sub-board 103 to suppress an ambient electromagnetic noise and to avoid a power frequency electromagnetic interference.

The metal shielding 105 is provided with a through hole 106. During use of the sensor, a protrusion of an external device under test can penetrate the through hole to apply a pressure stress on the first circuit board. The position of the through hole can be selected anywhere on the sub-board 103, merely by allowing the sub-board 103 to deform correspondingly when subjected to the pressure stress. The position is also adjustable depending on a range of pressure stress to be measured. For example, when the pressure stress to be measured is relatively small, the through hole can be disposed at the tail end of the sub-board 103, such that the sensor is more sensitive. In contrast, when the pressure stress to be measured is relatively large, the through hole can be alternatively disposed in the middle of the sub-board 103 or a connection end of the sub-board 103.

In one embodiment, during operation of the sensor, the piezoelectric film 101 sandwiched between two shielding layers is shielded by the metal shielding 105 on a top side and is shielded by clad copper of the second circuit board 200 on a bottom side, which jointly suppress an ambient interference.

Furthermore, both the first circuit board 100 and the second circuit board 200 may be made of a conventional circuit board material FR-4 (a glass fiber epoxy laminate), or may be made of other circuit board materials on which a circuit layout can be designed, for example a composite substrate, such as a single-sided partial-fiberglass plate 22F, a single-sided fiberglass plate CEM-1 and a dual-sided partial-fiberglass plate CEM-3, or a metal substrate.

During manufacturing of the sensor, firstly, the board-to-board connectors and the metal shielding 105 are respectively welded to the first circuit board 100 and the second circuit board 200, the piezoelectric film 101 is then attached at room temperature, and the first circuit board 100 and the second circuit board 200 are respectively tested. After the test is completed, the first circuit board 100 is directly plugged onto the second circuit board 200, so as to form the complete piezoelectric sensor. During overhaul of the sensor, the first circuit board 100 is directly detached, so that fault detection can be separately performed, and the piezoelectric film 101 can be conveniently replaced. Moreover, an operation at a high temperature is avoided in the presence of the piezoelectric film, thereby preventing any damage to the piezoelectric film caused by overheating.

Furthermore, it is also possible to provide no elastic pad 202 in the gap between the first circuit board 100 and the second circuit board 200, in which case the sensor can be used as an acceleration sensor. When the sensor vibrates, since there is no elastic pad 202, the sub-board 103 vibrates along with it to force the piezoelectric film 101 to deform, and then a current acceleration value can be accurately obtained by providing the signal processing unit.

The preferred embodiments of the disclosure have been described in detail above. It should be understood that those of ordinary skill in the art would be able to make various modifications and variations according to the concept of the disclosure without involving any inventive effort. Therefore, any solution that can be obtained by those skilled in the art by logical analysis, reasoning or limited trials on the basis of the prior art and according to the concept of the disclosure should be included within the scope of the claims.

6

The invention claimed is:

1. A split-type piezoelectric sensor comprising a first circuit board and a second circuit board,
   wherein the first circuit board comprises a sub-board, a piezoelectric film, and a first connector, wherein the sub-board and the first circuit board are located on a same plane, and the sub-board is located in a hollow area of the first circuit board and one end of the sub-board is connected to the first circuit board, so that the sub-board is displaceable by taking the end connected to the first circuit board as a fulcrum, wherein the piezoelectric film is attached to the sub-board and electrically connected to the sub-board, and wherein the first connector and the piezoelectric film are provided on a same side, and the first connector is electrically connected to the first circuit board; and
   wherein the second circuit board includes a signal processing unit and a second connector electrically connected to the signal processing unit, and wherein the second connector is opposite to and detachably and electrically connected to the first connector, and the second connector supports the first circuit board from the second circuit board by connecting to the first connector.

2. The split-type piezoelectric sensor according to claim 1, wherein one side of the second circuit board on which the second connector is arranged is clad with copper.

3. The split-type piezoelectric sensor according to claim 1, wherein a plurality of first connectors and a plurality of second connectors are provided, and the first connectors surround the hollow area.

4. The split-type piezoelectric sensor according to claim 1, wherein it further comprises an elastic pad, which is arranged between the piezoelectric film and the second circuit board.

5. The split-type piezoelectric sensor according to claim 1, wherein a shielding is arranged on a surface of the first circuit board that is opposite to the piezoelectric film, and the shielding surrounds the hollow area.

6. The split-type piezoelectric sensor according to claim 5, wherein the shielding comprises a through hole.

* * * * *